United States Patent
Hebbar et al.

(10) Patent No.: US 12,282,451 B2
(45) Date of Patent: Apr. 22, 2025

(54) FILE ENRICHMENT FOR SYSTEM MIGRATION

(71) Applicant: Truist Bank, Charlotte, NC (US)

(72) Inventors: Nagaraja Hebbar, Atlanta, GA (US); Sunitha Sounderrajan, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 111 days.

(21) Appl. No.: 18/123,061

(22) Filed: Mar. 17, 2023

(65) Prior Publication Data

US 2024/0311335 A1     Sep. 19, 2024

(51) Int. Cl.
*G06F 16/00*     (2019.01)
*G06F 16/11*     (2019.01)
*G06F 16/215*     (2019.01)

(52) U.S. Cl.
CPC .......... *G06F 16/119* (2019.01); *G06F 16/116* (2019.01); *G06F 16/215* (2019.01)

(58) Field of Classification Search
CPC ..... G06F 16/116; G06F 16/119; G06F 16/215
See application file for complete search history.

(56) References Cited

U.S. PATENT DOCUMENTS

| | | | | |
|---|---|---|---|---|
| 2003/0101199 | A1* | 5/2003 | Briggi | G06F 16/93 |
| 2006/0046854 | A1* | 3/2006 | Arevalo Baeza | A63F 13/12 |
| | | | | 463/42 |
| 2012/0221623 | A1* | 8/2012 | Ebrahimi | G06F 11/3082 |
| | | | | 709/202 |
| 2015/0293980 | A1* | 10/2015 | Dola | G06F 21/60 |
| | | | | 726/26 |

* cited by examiner

*Primary Examiner* — Diedra McQuitery
(74) *Attorney, Agent, or Firm* — Kilpatrick Townsend & Stockton LLP; Michael A. Springs, Esq.

(57) ABSTRACT

A computer implemented method includes receiving an array of files from a plurality of original databases to a loader component from a file watcher. The method also includes validating the array of files within a validation component and enriching the array of files with an enrichment component. Enriching the array of files may include identifying data within a file that can be included in an updated file type and splitting the data across multiple fields to make the data conform to the updated file type. Enriching the array of files may further include compressing data from multiple fields into a single field to make the data conform to the updated file type or providing placeholder data to enable a file to conform to the updated file type. The method may also include loading the array of files to a migration hub.

17 Claims, 3 Drawing Sheets

FILE ENRICHMENT FOR SYSTEM MIGRATION

TECHNICAL FIELD

The present disclosure relates generally to data storage and, more particularly (although not necessarily exclusively), to enriching files to adhere to an updated format for a system migration process.

BACKGROUND

Filing systems, whether digital or by paper, may vary in format. Files in one format may not be correctly interpreted when submitted to a system designed to receive a different format. For example, a record may have an address in a second field of the record. The record, which may be designed for a first system, may be migrated to a second system expecting different information in the second field of the record. As a result, the second system may record incorrect information or may reject the information. To integrate these varying file formats into an updated format, a system may need to recognize the type of information present in a file and alter the file so that it conforms to the updated format.

SUMMARY

In an example, a computing device includes a processor and a non-transitory computer-readable medium including instructions that are executable by the processor for causing the processor to receive an array of files from a plurality of original databases to a loader component from a file watcher. The instructions can further cause the processor to validate the array of files within a validation component and enrich the array of files with an enrichment component. In such an example, enriching the array of files may include instructions which cause the processor to identify data within a file that can be included in an updated file type and split the data across multiple fields to make the data conform to the updated file type. Enriching the array of files may further include instructions to compress data from multiple fields into a single field to make the data conform to the updated file type or provide placeholder data to enable a file to conform to the updated file type. The instructions may further include instructions to load the array of files to a migration hub.

In an additional example, a computer implemented method includes receiving an array of files from a plurality of original databases to a loader component from a file watcher. The computer implemented method can also include validating the array of files with a validation component and enriching the array of files with an enrichment component. Enriching the array of files may include identifying data within a file that can be included in an updated file type, splitting data across multiple fields to make the data conform to the updated file type, compressing data from multiple fields into a single field to make the data conform to the updated file type, or providing placeholder data to enable a file to conform to the updated file type. The computer implemented method may also include loading the array of files to a migration hub.

In an additional example, a non-transitory computer-readable medium may include instructions that are executable by a processing device for causing the processing device to receive an array of files from a plurality of original databases to a loader component from a file watcher. The instructions can further cause the processing device to validate the array of files within a validation component and enrich the array of files with an enrichment component. In such an example, enriching the array of files may include instructions which cause the processor to identify data within a file that can be included in an updated file type and split the data across multiple fields to make the data conform to the updated file type. Enriching the array of files may further include instructions to compress data from multiple fields into a single filed to make the data conform to the updated file type or provide placeholder data to enable a file to conform to the updated file type. The instructions may further include instructions to load the array of files to a migration hub.

DETAILED DESCRIPTION

Certain aspects and examples of the present disclosure relate to enriching files within an array of files before integrating the files into a migration hub. Enriching files may involve recognizing data types within fields of a file, splitting data to occupy a greater number of fields, compressing data to occupy a smaller number of fields, reordering data fields, or changing the number of data fields to make a file adhere to an updated format. An array of files may be a collection of files subjected to the enrichment process. The size of the array may be determined manually or determined by available computing resources. A migration hub may be an element of a file enriching system that passes files of the updated format to the current system. For example, mortgage records from disparate, outdated systems may be enriched before being uploaded to the current system.

By enriching files as arrays rather than as individual files, files within an array may be enriched in parallel either by different threads of processors or by different nodes of a distributed computing environment. An advantage of enriching files in parallel may be a significantly faster throughput of files uploaded into a third-party database in an updated format. Increased throughput may, in turn, reduce system downtime when enriching the files into the updated format.

Before enrichment, files may be loaded into an array of files. The files may originate from different databases, originate from different entities, and may be in different formats. During the loading process, files within the array may be audited to ensure no expected files are missing within the array. The files may then be validated before enrichment. Validation may involve ensuring files within the array are complete within their present format. For example, a validation component may check for expected columns within a given file format. In such an example, the validation component may have different expectations for the content of different columns across different file types.

Files that fail either the audit within the loading process or fail the validation process may be passed to a reconciliation component for further review. The reconciliation component may report various metrics regarding the received files. For example, the reconciliation component may report a failure rate. The reconciliation component may alter the computing resources dedicated to itself or any other component, based on data within a report.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
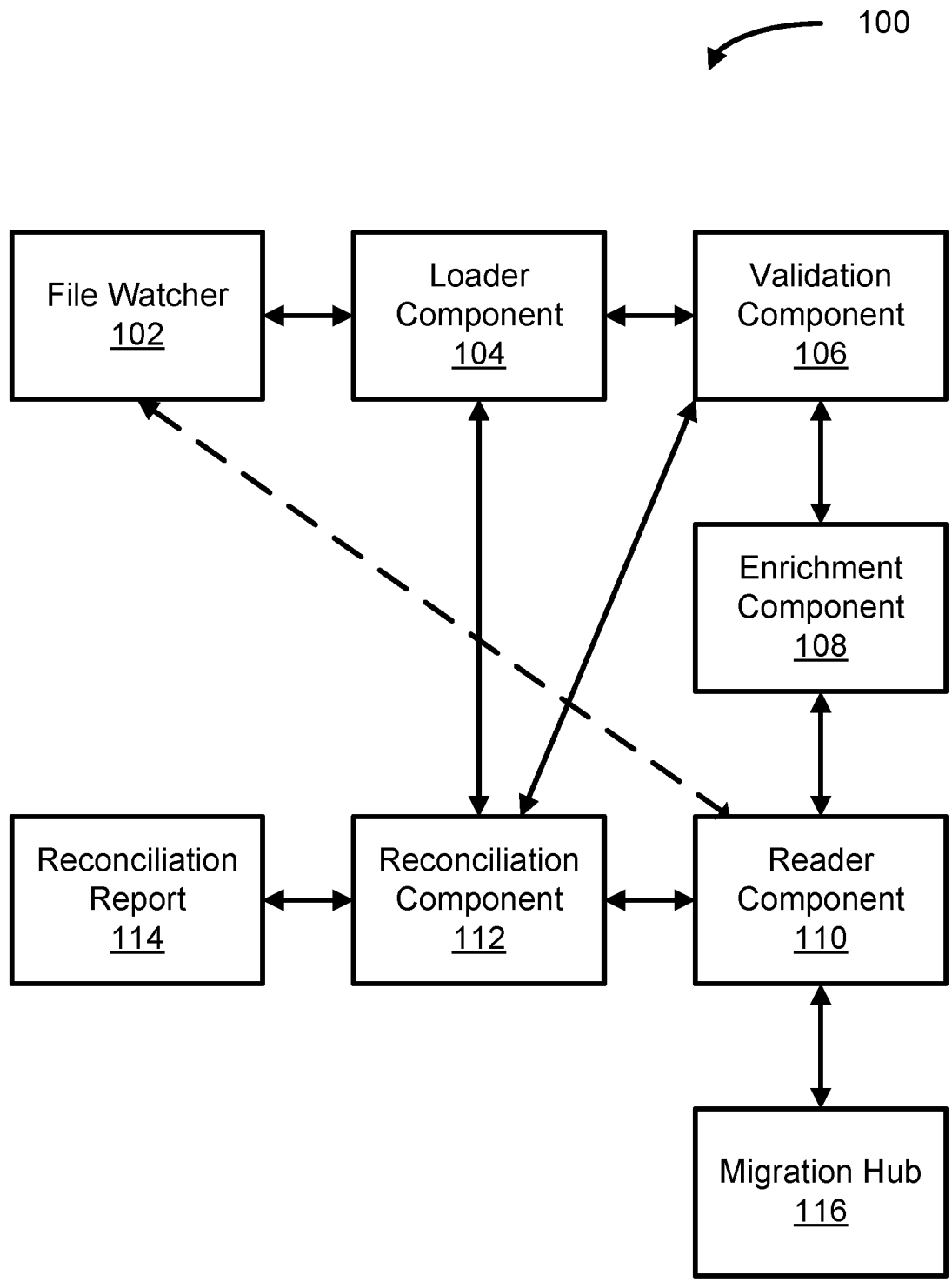
FIG. 1 is a block diagram of a system for enriching an array of files according to some aspects of the present disclosure.

FIG. 1 is a block diagram of a system 100 for enriching an array of files according to some aspects of the present disclosure. The system 100 includes a file watcher 102, a loader component 104, a validation component 106, an enrichment component 108, a reader component, 110, a reconciliation component 112, a reconciliation report 114, and a migration hub 116.

The file watcher 102 may receive files of various formats and sizes from various databases and entities. In some examples, the files may be related to transactions made within an automated clearing house (ACH) or any other file type. For example, the file watcher 102 may receive medical records from various hospitals and the medical records may be in various formats. As another example, the file watcher 102 may receive various mortgage records from various loan providers. The file types may require various extensions, require various applications, possess various syntaxes, contain various scripts or magic numbers, be presented in various types of computer code or computer language, or possess various unique identifiers. The file watcher 102 may store the files in their original form in a database associated with the system 100.

The file watcher 102 may assemble files into an array of files so that the files can be more easily processed with parallel processing methods such as through multiple processor threads or multiple distributed computing nodes. Assembling files into an array of files may also reduce the amount of internal messages sent between components of the system 100, which could also lead to faster processing. The file watcher 102 may use an automated machine learning tool, such as the python-based tree-based pipeline optimization tool (TPOT), to interpret data from the reconciliation report 114 and optimally adjust the number of files within the array of files. The TPOT may automatically adjust the number of files within the array of files based on features within the files.

The loader component 104 may receive the array of files from the file watcher 102. While the system 100 may be able to digest and store a wide array of filetypes from their original database in their original formats, the loader component 104 may extract files from the array of files that may not be digested by the rest of the system 100. The loader component 104 may pass such extracted files to the reconciliation component 112. The loader component 104 may audit the array of files to ensure no expected files are missing. The system 100 may host multiple loader components based on factors such as the number of files within the array of files.

The validation component 106 may receive the array of files from the loader component 104. The validation component 106 may ensure files within the array of files are complete within their present format. For example, the validation component 106 may ensure a file within the array of files possesses an expected number of completed data fields. The system 100 may host multiple validation components based on factors such as the number of files within the array of files. The validation component 106 may pass incomplete files to either the enrichment component 108 or the reconciliation component 112 based on the nature of the file's incompleteness. For example, the validation component 106 may pass a file with a middle initial where a full middle name is expected to the enrichment component 108 whereas the validation component 106 may pass a file missing an account number to the reconciliation component 112. The validation component 106 may perform various sanity tests on data within a file. For example, the validation component 106 may ensure a file with a date entered as the $30^{th}$ of February is routed to the reconciliation component 112.

The enrichment component 108 may receive the array of files from the validation component 106. The enrichment component 108 may identify and extract data within a file from the array of files and deposit the data into a file of an updated file type. The enrichment component 108 may identify data within a file that can be changed to make the data conform to the updated file type without compromising what is represented by the data. For example, the enrichment component 108 may alter a date in which the day, month, and year are divided with dashes to be divided with slashes. The enrichment component 108 may rearrange data within the original file to make the data conform to the updated file type. For example, the enrichment component 108 may split data across multiple fields, such as dividing an address field into a street address, a state or province, and a zip code or postal code. Also, the enrichment component 108 may compress data from multiple fields into a single field, such as compressing a first name and a last name into a single name filed. The enrichment component 108 may provide placeholder data to enable a file to conform to the updated file type. For example, the updated file type may have space for three previous employers. The original file may only contain data for two previous employers. The enrichment component 108 may insert placeholder data, such as a 555-5555 phone number, to satisfy the updated file type. The updated file type and the techniques used by the enrichment component 108 to satisfy the updated file type may vary based on the demands of the migration hub 116. The system 100 may host multiple enrichment components based on a variety of factors, such as the number of files within the array of files or the average computational time and computational resources required to submit a file to the enrichment process.

The reader component 110 may receive the array of files from the enrichment component 108. The reader component 110 may further verify the array of files with techniques and criteria similar to the validation component 106 after the array of files has been subjected to the enrichment process and may conform to the updated file type. The files within the array of files may be committed by the reader component 110 concurrently rather than consecutively, where committing the files may involve ensuring the files adhere to atomicity, consistency, appropriate isolation, and durability. Atomicity may be an indivisible and irreducible operation. For example, a file may have a transaction property of atomicity if the file indicates a transfer from account A to account B wherein funds are neither created nor lost if either the sending from account A or receiving from account B fails. Consistency may be an operation which affects a change in an allowed way. For example, a file may have a transaction property of consistency if the file indicates a transfer from account A to account B, where the funds are not mistakenly removed from account B. Isolation may indicate a file's visibility to the system 100 or to other systems more broadly. For example, a transfer from account A to account B may be visible to the bank of account A and the bank of account B but may not be visible to a bank uninvolved in the transaction. Durability may be an operation that survives permanently. For example, a file may be durable if it survives after the system 100 suffers a crash.

The reader component 110 may insert a plurality of files from the array of files into the migration hub 116 before committing the files to the migration hub 116. For example, a Structured Query Language (SQL) insert may constitute filling data fields with values in a table. Also, a commit may constitute making a set of tentative changes permanent and may mark the end of a transaction to provide added durability. The reader component 110 may insert multiple fields from multiple files before committing the inserts from multiple files with a single commit statement.

The commitment by the reader component 110 to the files of the array of files may be performed in parallel by either multiple reader components running on multiple threads or multiple nodes of a distributed computer environment. The reader component 110 may be programmed to execute a plurality of inserts and concurrently execute multiple commitments as well. The reader component 110 may submit files from the array of files to the reconciliation component 112 that it may be unable to satisfactorily commit to the migration hub 116.

The reader component 110 may have received information from the file watcher 102 so that the reader component 110 may effectively listen for and anticipate the files expected from the array of files. The reader component 110 may report which files have and have not arrived from the array of files to the reconciliation component 112 and may report such information in the reconciliation report 114. The reader component 110 may report various performance information related to processing the array of files, such as mean time between failures, mean time to repair, mean time to recovery, identifying which party is responsible for reporting faults or paying fees, responsibility for various data rates, throughput of various components, timing deviations, or similar details.

The migration hub 116 may receive the array of files so that they may be uploaded to a third-party database outside of the system 100. The migration hub 116 may be interchanged with an alternative hub that may be customized to another third party. In some examples, the migration hub 116 may pass files from the array of files to an appropriate third party from a plurality of third parties. The migration hub 116 may include multiple listener components to load files within the array of files in parallel.

The reconciliation component 112 may have a graphical user interface that may present a user with files that may not have passed through the loader component 104, validation component 106, enrichment component 108, or reader component 110. A user may use judgment to make corrections or alterations that the various components may not have been able to, and the reconciliation component 112 may allow the user to resubmit the files they have corrected or altered to either the appropriate component or to the file watcher 102 to be part of a new array of files.

The reconciliation component 112 may produce the reconciliation report 114. The reconciliation report 114 may include information related to runtimes, failure rates, data related to computing resources utilized by various components, or requests for scaling up or down either the computing resources dedicated to any given component or the number of any given component. The reconciliation report 114 may name files from the array of files that were submitted to the reconciliation component 112 from the various components for any reason. The reconciliation report 114 may provide a report of what files were processed, how many transactions were processed, how many files timed out, what corrective measures were taken at any given point, and how successful those measures were.

Figure 2:
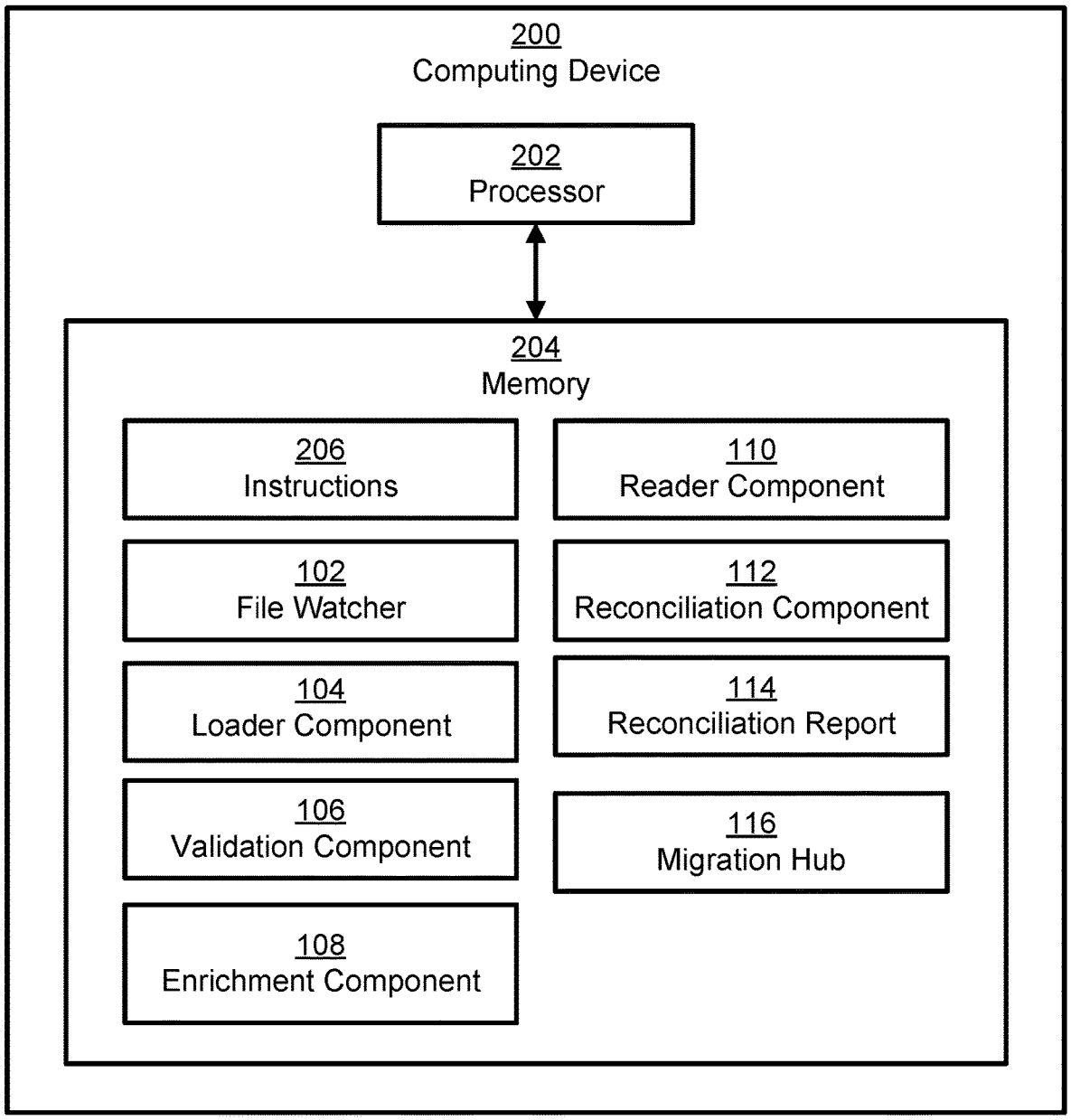
FIG. 2 is a block diagram of a computing device with instructions for enriching an array of files according to some aspects of the present disclosure.

FIG. 2 is a block diagram of a computing device 200 with instructions for enriching an array of files according to some aspects of the present disclosure. The computing device 200 includes a processor 202 that is communicatively coupled to a memory 204. In some examples, the processor 202 and the memory 204 may be distributed from (e.g., remote to) one another.

The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in a suitable computer-programming language, such as C, C++, C #, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium form which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206. The memory also includes a loader component 104, a validation component 106, an enrichment component 108, a reader component 110, a reconciliation component 112, a reconciliation report 114, and a migration hub 116.

Figure 3:
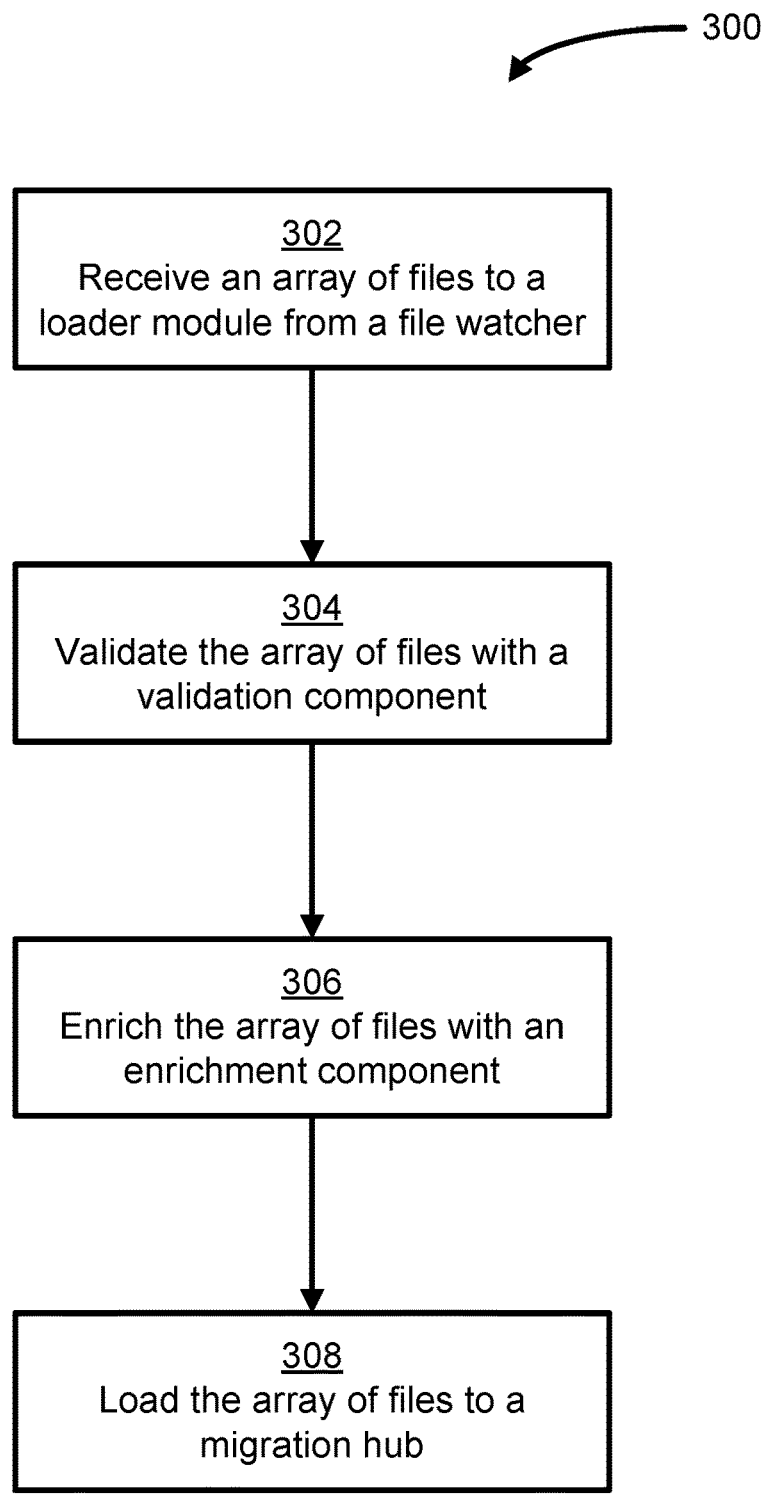
FIG. 3 is a flowchart of an example process for enriching an array of files according to some aspects of the present disclosure.

FIG. 3 is a flowchart of an example process 300 for enriching an array of files according to some aspects of the present disclosure. Some examples may include more steps, fewer steps, different steps, or a different combination of steps than the blocks shown in FIG. 3. The blocks of FIG. 3 are described below with reference to the components of FIGS. 1 and 2 described above.

At block 302, the processor 202 may receive an array of files to a loader component 104 from a file watcher 102. The computing device 200 may create parallel nodes to expand the loader component 104. The computing device 200 may create the parallel nodes based on a reconciliation report 114, which may indicate a use of computing resources, passage rates, failure rates, and the like. The loader component 104 may receive an array of files from the file watcher 102. The loader component 104 may extract files from the array of files that may not be digestible by the subsequent components. The loader component 104 may pass such extracted files to the reconciliation component 112. The loader component 104 may audit the array of files to ensure no expected files are missing.

At block 304, the processor 202 may validate the array of files within a validation component 106. The computing device 200 may create parallel nodes to expand the validation component 106. The computing device 200 may create the parallel nodes based on a reconciliation report 114. The validation component 106 may ensure that a file within the array of files is complete within its present format. The validation component 106 may pass incomplete files to either the enrichment component 108 or the reconciliation component 112. The validation component 106 may perform various sanity tests on data within a file.

At block 306, the processor 202 may enrich the array of files with an enrichment component 108. The computing device 200 may create parallel nodes to expand the enrichment component 108. The computing device 200 may create the parallel nodes based on a reconciliation report 114. The enrichment component 108 may identify and extract data with a file from the array of files and deposit the data into a file of an updated file type. The enrichment component 108 may identify data within a file that can be changed to make the data conform to the updated file type without compromising what is represented by the data. The enrichment component 108 may rearrange data within the original file to make the data conform to the updated file type. The enrichment component 108 may compress data from multiple fields into a single field. The enrichment component 108 may provide placeholder data to allow a file to conform to the updated file type. The updated file type and the techniques used by the enrichment component 108 to satisfy the updated file type may vary based on the demands of the migration hub 116.

At block 308 the processor 202 may load the array of files to a migration hub 116. The computing device 200 may insert every file in the array of files to the migration hub 116 before subsequently committing every file in the array of files to the migration hub 116. In some examples, the migration hub 116 may pass files from the array of files to an appropriate third party from a plurality of third parties.

In some examples, the processor 202 may redirect incomplete files from the array of files to a reconciliation component 112 for an elevated inspection process. In some such examples, the processor 202 may cause the reconciliation component 112 to provide a reconciliation report 114. The reconciliation report 114 may describe which files were received by the migration hub 116, which files were redirected to the reconciliation component 112, why files were redirected to the reconciliation component 112, or the computational resources used by any given component. In some examples, the processor 202 may adjust the number of files in the array of files in response to the performance of any given component as described in the reconciliation report 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computing device comprising:
a processor; and
a non-transitory computer-readable medium comprising instructions that are executable by the processor to cause the processor to:
adjust a number of files in an array of files based on computational resources used by a loader component, a validation component, or an enrichment component;
receive the array of files from a plurality of original databases to the loader component from a file watcher;
validate the array of files with the validation component;
enrich the array of files with the enrichment component, wherein enriching the array of files includes instructions that are executable by the processor to perform at least one of:
identifying data within a file that is includable in an updated file type;
splitting data across multiple fields to make the data conform to the updated file type;
compressing data from multiple fields into a single field to make the data conform to the updated file type; or
providing placeholder data to enable a file to conform to the updated file type; and
load the array of files to a migration hub.

2. The computing device of claim 1, wherein the non-transitory computer-readable medium further comprises instructions that are executable by the processor to cause the processor to redirect incomplete files from the array of files to a reconciliation component for an elevated inspection process, wherein the elevated inspection process is navigable with a graphical user interface.

3. The computing device of claim 1, wherein the non-transitory computer-readable medium further comprises instructions that are executable by the processor to cause the processor to insert every file in the array of files to the migration hub before committing every file in the array of files simultaneously to the migration hub.

4. The computing device of claim 1, wherein the non-transitory computer-readable medium further comprises instructions that are executable by the processor to cause the processor to receive, from the file watcher, a list of expected files from the enrichment component and report files missing from the list of expected files.

5. The computing device of claim 1, wherein the non-transitory computer-readable medium further comprises instructions that are executable by the processor to cause the processor to create parallel nodes to expand the loader component, the validation component, or the enrichment component.

6. The computing device of claim 1, wherein the non-transitory computer-readable medium further comprises instructions that are executable by the processor to load the files within the array of files into the migration hub in parallel.

7. A computer implemented method comprising:
adjusting a number of files in an array of files based on computational resources used by a loader component, a validation component, or an enrichment component;
receiving the array of files from a plurality of original databases to the loader component from a file watcher;
validating the array of files with the validation component;
enriching the array of files with the enrichment component, wherein enriching the array of files includes at least one of:
identifying data within a file that is includable in an updated file type;

splitting data across multiple fields to make the data conform to the updated file type;

compressing data from multiple fields into a single filed to make the data conform to the updated file type; or providing placeholder data to enable a file to conform to the updated file type; and loading the array of files to a migration hub.

8. The computer implemented method of claim 7, further comprising redirecting incomplete files from the array of files to a reconciliation component for an elevated inspection process, wherein the elevated inspection process is navigable with a graphical user interface.

9. The computer implemented method of claim 7, further comprising inserting every file in the array of files to the migration hub before committing every file in the array of files simultaneously to the migration hub.

10. The computer implemented method of claim 7, further comprising receiving, from the file watcher, a list of expected files from the enrichment component and reporting the expected files missing from the list of expected files.

11. The computer implemented method of claim 7, further comprising creating parallel nodes to expand the loader component, the validation component, or the enrichment component.

12. The computer implemented method of claim 7, further comprising loading the files within the array of files into the migration hub in parallel.

13. A non-transitory computer-readable medium comprising instructions that are executable by a processing device for causing the processing device to:

adjust a number of files in an array of files based on computational resources used by a loader component, a validation component, or an enrichment component;

receive the array of files from a plurality of original databases to the loader component from a file watcher;

validate the array of files with the validation component;

enrich the array of files with the enrichment component, wherein enriching the array of files includes instructions to perform at least one of:

identifying data within a file that is includable in an updated file type;

splitting data across multiple fields to make the data conform to the updated file type;

compressing data from multiple fields into a single field to make the data conform to the updated file type; or providing placeholder data to enable a file to conform to the updated file type; and load the array of files to a migration hub.

14. The non-transitory computer-readable medium of claim 13, further comprising instructions that are executable by the processing device to cause the processing device to redirect incomplete files from the array of files to a reconciliation component for an elevated inspection process, wherein the elevated inspection process is navigable with a graphical user interface.

15. The non-transitory computer-readable medium of claim 13, further comprising instructions that are executable by the processing device to cause the processing device to insert every file in the array of files to the migration hub before committing every file in the array of files simultaneously to the migration hub.

16. The non-transitory computer-readable medium of claim 13, further comprising instructions that are executable by the processing device to receive, from the file watcher, a list of expected files from the enrichment component and report the files missing from the list of expected files.

17. The non-transitory computer-readable medium of claim 13, further comprising instructions that are executable by the processing device to cause the processing device to create parallel nodes to expand the loader component, the validation component, or the enrichment component.

* * * * *